United States Patent [19]

Shu

[11] Patent Number: 5,522,460
[45] Date of Patent: Jun. 4, 1996

[54] WATER COMPATIBLE CHEMICAL IN SITU AND SAND CONSOLIDATION WITH FURAN RESIN

[75] Inventor: Paul Shu, Cranbury, N.J.

[73] Assignee: Mobil Oil Corporation, Fairfax, Va.

[21] Appl. No.: 380,869

[22] Filed: Jan. 30, 1995

[51] Int. Cl.$^6$ ............................................. E21B 33/138
[52] U.S. Cl. ........................ 166/295; 166/300; 523/131
[58] Field of Search ............................... 166/295, 300; 405/264; 523/131, 132

[56] References Cited

U.S. PATENT DOCUMENTS

| | | |
|---|---|---|
| 3,199,590 | 8/1965 | Young . |
| 3,209,826 | 10/1965 | Young . |
| 3,437,143 | 4/1969 | Cook ........................................ 166/285 |
| 4,042,032 | 8/1977 | Anderson et al. .................. 166/295 X |
| 4,903,770 | 2/1990 | Friedman et al. ...................... 166/288 |
| 5,178,218 | 1/1993 | Dees .................................. 166/295 X |
| 5,423,381 | 6/1995 | Surles et al. .......................... 166/295 |

OTHER PUBLICATIONS

*"Kirk–Othmer Encyclopedia of Chemical Technology,"* 3rd. edition, vol. 11, pp. 499–527.

*Primary Examiner*—George A. Suchfield
*Attorney, Agent, or Firm*—Ronald A. Bleeker; Dennis P. Santini; Lori F. Cuomo

[57] ABSTRACT

A method for water compatible chemical in situ sand consolidation with oil soluble furan resin. The three step water compatible in situ chemical consolidation uses thermally and chemically stable furan resin. The placement of the resin is by phase separation rather than by conventional fluid displacement. The method uses the injection of resin/water miscible organic solvent solution followed by a spacer volume of water and acid catalyst injection.

15 Claims, No Drawings

WATER COMPATIBLE CHEMICAL IN SITU AND SAND CONSOLIDATION WITH FURAN RESIN

FIELD OF THE INVENTION

This invention relates to the consolidation of subterranean formations and, more particularly, to the water compatible in situ sand consolidation of subterranean formations with furan resin.

BACKGROUND OF THE INVENTION

It is well known in the art that wells in sandy, oil-bearing formations are frequently difficult to operate because the sand in the formation is poorly consolidated and tends to flow into the well with the oil. This "sand production" is a serious problem because the sand causes erosion and premature wearing out of the pumping equipment, and is a nuisance to remove from the oil at a later point in the production operation.

Furan resin has been used in situ chemical sand consolidation since the 1960's, as described in U.S. Pat. Nos. 3,199,590 and 3,209,826. Due to the reactivity of furan resin and it's incompatibility with water, early sand consolidation processes use a multi-slug injection, externally catalyzed procedure to ensure a strong resin sand adhesion and gelation rate control. An injection sequence of diesel oil preflush followed by resin injection, diesel oil spacer and catalyst is complicated and gives inconsistent results. In addition, this oil based process presented disposal and fire hazard problems. In the 1970's, the process was modified and the diesel oil was replaced by brine in the preflush and spacer injections. However, the success rate and reliability were not improved.

Commercial furan resin is in the prepolymer stage of furfuryl alcohol (FA), as described by Grayson, ed. "Kirk-Othmer Encyclopedia of Chemical Technology," 3rd edition, Vol. 11, pp. 499–527. Furan resin available from Quaker Oat Chemicals is polymerized to a viscosity of 240–270 centipoise (at 55° C.).

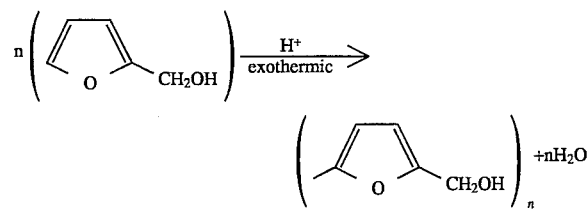

The resinification of furan resin catalyzed by strong acids to form a thermally and chemically stable material is applied in the preparation of foundry cores and in the laminating of graphite and glass fibers. The polymerization reaction is highly exothermic and is difficult to control at high temperature. Typical foundry formulations with an internal phthaloyl chloride catalyst gel and set within 20 minutes at 25° C. Up to about 18% water is produced in the polymerization of FA. The volume shrinkage and the moisture trapped in the laminating intersurfaces are some of the difficulties in furan resin applications.

U.S. Pat. No. 4,903,770 describes a furan based process for the sand consolidation in steam injected wells. It places a furfuryl alcohol/ester diluent/$H_2SO_4$ mixture delivered with high quality steam after an ester-acid preflush to achieve a rapid consolidation near the perforations.

To use furan resin, the resin must be deposited uniformly on the surfaces of sand grains. The water in the formation and the water that is a reaction product must be removed effectively for a strong bonding between resin and sand. Formation water removal by displacement with diesel/surfactant is inefficient and costly. Resin placement by displacement with another fluid, such as diesel or brine, is not reliable in heterogeneous formations.

Therefore, it is an object of the present invention to provide a reliable resin placement method. It is a further object of the present invention to provide a sand consolidation method which is less wasteful.

SUMMARY OF THE INVENTION

The method of the present invention relates to water compatible chemical in situ sand consolidation with oil soluble furan resin. The three step water compatible in situ chemical consolidation uses thermally and chemically stable furan resin. The water compatible sand consolidation method of the present invention is based on the phase separation mechanism for the placement of the resin rather than conventional fluid displacement for better control of resin deposition and less consumption of chemicals. The three component system of the present invention comprises furan resin, solvent and water. The resin placement in the phase separation mechanism is controlled by the composition of the two phase system of resin-solvent and water and their mutual solubilities. Resin phase separation takes place when the resin solution encounters water. The method of the present invention results in high strength and high permeability consolidation.

The method comprises the injection of resin/water miscible organic solvent solution followed by a spacer volume of water and acid catalyst injection. The water compatibility and resin deposition are achieved by using water miscible organic solvents, such as alcohols, as the mutual solvent. As the resin solution flows through a water wet formation of reservoir it displaces the water. The resin solution also deposits the resin on the surface of sand through mixing with water remaining in the pores. Surface water on the sand is removed by partitioning into the water miscible organic solvent phase. This method results in strong adhesion and bonding of the sand.

The invention therefore includes a sand consolidating method for an unconsolidated or loosely consolidated formation which comprises the steps of:

introducing a first solution comprising furan resin and water miscible organic solvent into the formation to be consolidated;

next introducing a spacer volume of water into the formation to be consolidated; and thereafter, introducing a second solution comprising acid catalyst into the formation, thereby consolidating the formation.

DETAILED DESCRIPTION OF THE INVENTION

The method of the present invention involves a three step injection process to achieve a uniform and strong sand consolidation. The method is water compatible and there is no need to dewater the formation prior to the resin placement.

It is advantageous to clean the formation to be treated prior to furan resin/water miscible organic solvent injection by conventional means, for example aqueous treating solutions, such as brine and surfactants.

In the practice of this invention the slugs are injected into the well where they enter the formation via perforations. A method for perforating a wellbore is disclosed in U.S. Pat. No. 3,437,143 which issued to Cook on Apr. 8, 1969. This patent is hereby incorporated by reference herein.

In the first slug, furan resin is injected as a solution in a water miscible organic solvent into a water-wet formation. Water miscible organic solvents, such as lower alcohols and acetic acid, are suitable delivery solvents for furan resin.

A uniform deposition of resin is achieved by it's phase separation from the water miscible organic solvent due to the introduction of water. Resin deposition in the method of the present invention is less dependent on the formation permeability and the viscosity of subsequently injected fluid than in conventional fluid displacement methods. Water in the formation is used advantageously to aid the deposition of the resin. At the same time water in the pores is removed by partitioning into the water miscible organic solvent phase which is moving forward to displace water in the pores.

Thereafter, a spacer volume of water is directed into the well. The resin placed by the phase separation mechanism can tolerate the wash by a large volume of water spacer over a range of flow rates. The spacer volume of water does not wash out the resin due to the viscosity of the resin coating.

The spacer volume of water distributes the resin. The spacer volume of water further extracts the water miscible organic solvent to concentrate the resin coating to increase its viscosity. The spacer volume avoids plugging of the formation which would impede oil recovery, thereby obtaining a higher degree of permeability.

After a desired spacer volume of water has been placed into the well requiring sand consolidation an acid catalyst slug is injected. During the injection of the acid catalyst, the aqueous acid further promotes the phase separation of the resin and extracts excess water miscible organic solvent from the deposited resin. Phase-separated furan resin forms a plastic type material after curing with acid.

Generally, the amount of resin solution used to treat the formation is in the range of from about 0.5 to about 3 pore volumes. Clean sand with a uniform size distribution requires less than about 1 pore volume of resin solution. Dirty, clay type sand with residual crude oil saturation, such as Berea sand, requires more than about 1 pore volume resin solution.

The resin solution comprises furan resin in an amount in the range of from about 30 to about 90 wt. %, and preferably in the range of from about 40 to about 80 wt. %, determined by the desired levels of resin deposition. Loose, weakly consolidated formation requires a high resin concentration to deposit a heavier resin coating on the sand grains. A tight formation requires a more diluted resin solution.

The resin solution further comprises solvent in an amount in the range of from about 10 to about 70 wt. %. The solvents for use in the method of the present invention are water miscible organic solvents including water soluble carboxylic acids, alcohols, esters and/or ketones. Carboxylic acids and alcohols of lower carbon numbers ($C_1$–$C_6$), such as acetic acid, methanol and t-butyl alcohol, are preferred.

Solvents for use in the method of the present invention are not capable of cross-linking with furan resin. Methanol, acetic acid and t-butyl alcohol are especially useful because of the combination of excellent water miscibility and poor solvency for furan resin. Furan resin precipitates from these solvents readily when water is introduced.

Hydrolyzable co-solvents may also be used in the resin solution in order to adjust the solvency and help the flow properties of the resin solution. Residual water which remains in the resin is believed to be eventually reduced by co-solvent hydrolysis, for example, by ethyl acetate hydrolysis and/or acetic anhydride hydrolysis, in the resin phase.

Co-solvents may be water miscible organic solvents and/or water immiscible organic solvents which can be converted to water miscible organic solvents upon hydrolysis. Co-solvents include anhydrides, such as acetic anhydride, and esters, such as methylorthoformate and ethyl acetate. Suitable combinations of solvent/co-solvent include acetic acid/acetic anhydride, alcohol/ester and acetic acid/ester. The amount of co-solvent is generally in the range of from about 1 to about 50 wt. %.

A preferred combination of solvent/co-solvent is acetic acid/acetic anhydride. Furan resin precipitates from acetic acid solution rapidly and completely when water is introduced since it is a rather poor solvent for furan resin and has a high affinity to water. Acetic anhydride is not miscible with water but gradually reacts with water to form acetic acid. Acetic anhydride remains in the resin rich phase in the beginning of phase separation. It improves the mobility, or flow, of the resin phase and the distribution of resin. Acetic anhydride also slows resin precipitation to prevent plugging. After the placement of resin, it gradually hydrolyzes to form water soluble acetic acid and diffuses into the water phase to leave a viscous resin coating on the sand surfaces.

A spacer volume of water, such as fresh water, formation water, sea water and the like, is directed into the well after placement of the resin. Generally, from about 2 to about 20 pore volumes of spacer at a flow rate of about 0.1 to about 4 pore volumes per minute are used. Preferably, from about 4 to about 10 pore volumes of spacer at a flow rate of about 0.2 to about 2 pore volumes per minute are used.

An acid catalyst solution is injected after placement of the resin and injection of a spacer volume of water. Generally, at least about 1 pore volume of acid is required to set the resin. More generally, about 2 to about 8 pore volumes of acid is required to set the resin. Suitable acids for use in the process of the present invention include strong mineral acids, such as HCl, $H_2SO_4$ and $H_3PO_4$. The acid strength is generally in the range of from about 10 to about 50 wt. %.

Generally, the resin is set and cured for a time period in the range of from about 2 to about 24 hours. Rapid setting of the resin is preferred to avoid resin leak-off from the target zone and shorten the well's down time. The resin's setting rate is controlled by acid catalyst concentration and the formation temperature. For example, at a temperature of about 80° C., about 20% HCl is adequate to cure the resin in about 4 hours.

Optionally, a small amount, in the range of from about 1 to about 10 wt. %, of latent acid, such as triethylphosphate, can be added to the resin solution to improve acid-resin contact for a more complete curing of resin.

A silane coupling agent can also be added to the resin solution to promote coupling and adhesion of the furan resin to sand and other siliceous material in the formation. The silane coupling agent can be added in an amount in the range of from about 0.1 to about 5 wt. % and preferably in the range of from about 0.2 to about 2 wt. %.

A particularly suitable coupling agent is an amino silane compound or a mixture of amino silane compounds represented by the following formula:

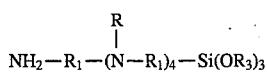

wherein:

$R_1$ is a straight, branched or cyclic chain alkyl radical having in the range of about 1 to about 8 carbon atoms; $R_2$ is hydrogen, an alkyl amine radical or an alkyl radical wherein the alkyl amine and alkyl radical have in the range of from about 1 to about 8 carbon atoms; $R_3$ is straight or branched chain alkyl radical having in the range of from about 1 to about 3 carbon atoms; and 'n' is an integer within the range of from zero to about 10. Examples of the foregoing amino silanes are gamma-aminopropyltriethoxysilane, N-beta-(aminoethyl)-gamma-aminopropyltrimethoxysilane, N-beta-(aminoethyl)-N-beta-(aminoethyl)-gamma-aminopropyltrimethoxysilane, N-beta-(aminopropy)-N-beta-(aminobutyl)-gamma-aminopropyltriethoxysilane, and di-N-(beta-aminoethyl)-gamma-aminopropyltrimethoxysilane.

Preferred amino silanes are represented by the following general formula:

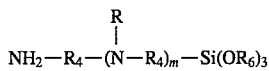

wherein:

$R_4$ is a straight or branched chain alkyl radical having in the range of from about 1 to about 4 carbon atoms; $R_5$ is hydrogen, an alkyl amine radical or an alkyl radical wherein the alkyl amine and alkyl radicals have in the range of from about 1 to about 4 carbon atoms; $R_6$ is an alkyl radical having in the range of from about 1 to about 2 carbon atoms; and 'm' is an integer in the range of from about 1 to about 4. Examples of the above amino silanes are N-beta (aminoethyl)-gamma-aminopropyl-trimethoxysilane, N-beta-(aminoethyl)-N-beta-(aminoethyl)-gamma-aminopropyltrimethoxysilane and N-beta-(aminopropyl)-gamma-aminopropyltriethoxysilane.

The most preferred amino silane compound for use in accordance with the method of the present invention is N-beta-(aminoethyl)-gamma-aminopropyltrimethoxysilane.

The process of the present invention uses resin placement by phase separation rather than conventional fluid displacement to provide better control of resin deposition.

The following examples illustrate the process of the present invention. Furan resin, having the properties set forth below in Table 1, is used in the examples.

TABLE 1

|  | Furan Resin |
| --- | --- |
| Viscosity, cps @ °F. | 240—270 @ 131° |
| Specific gravity g/cm³ @ 77° F. | 1.29 |
| Flash point, °F. | 164 |
| Monomer content, wt. % | Furfuryl alcohol, 4% |

Sandpacks are treated with 1 PV, 20% HCl for 2–4 hours at room temperature to remove the carbonates in the sand. $CO_2$ gas produced in an untreated sandpack interferes with the resin placement during HCl injection.

One inch diameter sandpacks are used. The sandpacks are made up of 5 g of 70–140 Granusil mesh sand packed at both inlet and outlet end, and 50 g of 310 mesh AGSCO sand in the middle. One pore volume (PV) is equivalent to about 10–12 ml. Fine 300 mesh nylon screens are used at the inlet and outlet ends of the sand pack.

Fluids are injected with a manual syringe. The injection rates are calculated based on the volume and time of injection.

Examples 1–6 are summarized in Table 2 below. Examples 1 and 2 show consolidation using t-butyl alcohol as the solvent. Example 3 shows consolidation using acetic acid as the solvent. Examples 4 and 5 show consolidation using acetic acid as the solvent with acetic anhydride as the co-solvent. Example 6 uses acetic acid as the solvent and acetic anhydride as the co-solvent with a silane coupling agent.

All consolidated sandpacks pass crush strength tests at 200 psi without failure. The amount of resin solution injected is between 6–12 grams (0.5–1 PV), at a concentration between 60–80 wt. %. The water spacer injected is between 20–100 ml. (1.5–8 PV). The water spacer injection rates vary between 0.6–20 ml./min (0.05–1.7 PV/min.). It is preferred to inject the first 0.05–1 PV of water spacer at a lower rate. The acid catalyst is 20 wt. % HCl and is injected at a rate between 1–20 ml./min. (0.08≅1.7 PV/min). The total acid injection is between 10–60 ml. (0.8 to 5 PV). The permeability in m darcy of Examples 1–6 is in general inversely proportional to resin content in the unconsolidated sandpack.

TABLE 2

| Example No. | Temp. °C. | | Resin Injection | | | | Water Spacer Injection | |
| --- | --- | --- | --- | --- | --- | --- | --- | --- |
| | Injection | Curing | Wt. g | Conc. Wt. % | Solvent | Injection Rate ml./min. | Vol. ml. | Injection Rate ml./min. |
| 1 | 70 | 70 | 6 | 70 | t-BuOH | 1 | 20 | 1 |
| 2 | 70 | 80 | 6 | 80 | t-BuOH | 1 | 60 | 2–8 |
| 3 | 80 | 80 | 8 | 60 | Acetic Acid | 1 | 0–20 | 0.67 |
| | | | | | | | 20–40 | 1.35 |
| | | | | | | | 40–60 | 5 |
| | | | | | | | 60–80 | 10 |
| | | | | | | | 90–100 | 20 |
| 4 | 75 | 80 | 12 | 80 | 1:1 | 1 | 40 | 0.66 |

TABLE 2-continued

| | Resin Injection | | | | | Water Spacer Injection | |
|---|---|---|---|---|---|---|---|
| 5 | 75 | 75 | 6 | 75 | Acetic Acid/Acetic Anhydride 2:1 | 0.5 | 60 | 1 |
| 6 | 80 | 80 | 8 | 60 | Acetic Acid/Acetic Anhydride 2:1 Acetic Acid/Acetic Anhydride 0.5% Silane* | 1 | 0–5<br>5–20<br>20–40<br>40–80 | 0.6<br>1.5<br>5<br>20 |

| | HCl Injection | | Consolidation Data | | | | |
|---|---|---|---|---|---|---|---|
| Example No. | Vol. ml. | Rate ml./min. | % Consol-idation | Wt. % Resin | Perme-ability | Poro-sity % | Compres-sive Strength, psi. |
| 1 | 50 | 2 | 100 | 3 | 766 | 32.9 | >200 |
| 2 | 0–20<br>20–40<br>40–60 | 4–6<br>8–10<br>20 | 100 | 3 | N/A | N/A | >200 |
| 3 | 20<br>20 | 7<br>10 | 100 | 2.7 | 113 | 31 | >200 |
| 4 | 10<br>10<br>20 | 1<br>5<br>10 | 100 | 6.7 | 80 | 34.6 | >200 |
| 5 | 20<br>20 | 1<br>2–3 | 87 | N/A | 213 | 34.1 | >200 |
| 6 | 60 | 10 | 100 | 3.3 | 194 | 32.8 | >200 |

*N-(2-aminoethyl)-3-amino-propyltrimethoxy silane
N/A - Not Available

Changes and modifications in the specifically described embodiments can be carried out without departing from the scope of the invention which is intended to be limited only by the scope of the appended claims.

I claim:

1. A sand consolidating method for an unconsolidated or loosely consolidated formation which comprises the steps of:

introducing a first solution comprising furan resin and water miscible organic solvent into the formation to be consolidated and wherein said water miscible organic solvent is selected from the group consisting of alcohols, water soluble carboxylic acids, ketones and mixtures thereof;

next introducing a spacer volume of water into the formation; and thereafter, introducing a second solution comprising acid into the formation, thereby consolidating the formation.

2. The method of claim 1, wherein said first solution comprises furan resin in an amount in the range of from about 30 to about 90 wt. %.

3. The method of claim 2, wherein said first solution comprises furan resin in an amount in the range of from about 40 to about 80 wt. %.

4. The method of claim 1, wherein said first solution is introduced in an amount in the range of from about 0.5 to about 3 pore volumes.

5. The method of claim 1, wherein said water miscible organic solvent is selected from the group consisting of methanol, t-butyl alcohol and mixtures thereof.

6. The method of claim 1, wherein said water miscible organic solvent is acetic acid.

7. The method of claim 1, wherein said first solution comprises a co-solvent.

8. The method of claim 1, wherein said co-solvent is selected from the group consisting of acetic anhydride, methylorthoformate, ethyl acetate and mixtures thereof.

9. The method of claim 7, wherein said water miscible organic solvent is t-butyl alcohol and said co-solvent is acetic anhydride.

10. The method of claim 7, wherein said water miscible organic solvent is acetic acid and said co-solvent is acetic anhydride.

11. The method of claim 1, wherein said first solution comprises a silane coupling agent.

12. The method of claim 1, wherein said spacer volume of water is introduced in an amount in the range of from about 2 to about 20 pore volumes.

13. The method of claim 1, wherein said second solution comprises acid in an amount in the range of from about 10 to about 50 wt. %.

14. The method of claim 1, wherein said second solution is introduced in an amount in the range of from about 2 to about 8 pore volumes.

15. The method of claim 1, wherein said acid is selected from the group consisting of HCl, $H_2SO_4$, $H_3PO_4$ and mixtures thereof.

* * * * *